(12) United States Patent
Henskes et al.

(10) Patent No.: US 11,576,367 B2
(45) Date of Patent: *Feb. 14, 2023

(54) SYSTEM AND METHODS FOR AUTOMATED WILDLIFE DETECTION, MONITORING AND CONTROL

(71) Applicant: Bird Control Group BV, Delft (NL)

(72) Inventors: Steinar Henskes, Delft (NL); Pim Tammes, Delft (NL); Kris Mooi, Delft (NL)

(73) Assignee: Bird Control Group BV, Delft (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,187

(22) Filed: Aug. 17, 2021

(65) Prior Publication Data

US 2021/0368776 A1 Dec. 2, 2021

Related U.S. Application Data

(63) Continuation of application No. 16/682,268, filed on Nov. 13, 2019, now Pat. No. 11,109,586.

(51) Int. Cl.
| | |
|---|---|
| *A01M 29/10* | (2011.01) |
| *G06T 7/194* | (2017.01) |
| *A01M 29/16* | (2011.01) |
| *A01M 31/00* | (2006.01) |
| *G06K 9/00* | (2022.01) |
| *G06N 3/08* | (2006.01) |
| *G06V 40/10* | (2022.01) |

(52) U.S. Cl.
CPC ............ *A01M 29/10* (2013.01); *A01M 29/16* (2013.01); *A01M 31/002* (2013.01); *G06N 3/08* (2013.01); *G06T 7/194* (2017.01); *G06V 40/10* (2022.01)

(58) Field of Classification Search
CPC .... A01M 29/10; A01M 29/16; A01M 31/002; G06T 7/194; G06K 9/00362; G06V 40/10; G06N 3/08

See application file for complete search history.

(56) References Cited

U.S. PATENT DOCUMENTS

| 7,656,300 B2 | 2/2010 | Ronnau |
| 8,164,462 B1 | 4/2012 | Bose et al. |

(Continued)

FOREIGN PATENT DOCUMENTS

| CN | 102004924 A | 4/2011 |
| CN | 106875398 A * | 6/2017 |

(Continued)

OTHER PUBLICATIONS

Chernbumroong, S., et al., Measuring of Background Modeling and Subtraction Algorithms on Moving Object Detection in Video Sequences in Chiangmai, ARPN Journal of Engineering and Applied Sciences, vol. 12, No. 11, Jun. 2017.

*Primary Examiner* — Chico A Foxx
(74) *Attorney, Agent, or Firm* — Barlow Josephs and Holmes Ltd; Stephen Holmes

(57) ABSTRACT

The present disclosure describes a system which is able to detect and recognize wildlife, and in particular birds, using camera images. The present solution is comprised of algorithms, software and integrated hardware devices. Properly equipped, the system can be made to be portable and can be set up at any location for different wildlife detection and repelling purposes.

12 Claims, 8 Drawing Sheets

(56) References Cited

U.S. PATENT DOCUMENTS

| | | |
|---|---|---|
| 9,519,962 B1 | 12/2016 | Normand |
| 9,563,852 B1 | 2/2017 | Wiles et al. |
| 10,152,035 B2 | 12/2018 | Reid et al. |
| 10,282,852 B1 | 5/2019 | Buibas et al. |
| 10,452,980 B1 | 10/2019 | Kim et al. |
| 10,614,736 B2 | 4/2020 | Von Droogenbroeck et al. |
| 10,694,737 B2 | 6/2020 | Tillotson |
| 10,796,141 B1* | 10/2020 | Shepherd, Jr. .......... G06V 10/34 |
| 2004/0141635 A1* | 7/2004 | Liang .................... A61B 5/1118 |
| | | 382/110 |
| 2006/0126918 A1 | 6/2006 | Oohashi et al. |
| 2009/0066817 A1* | 3/2009 | Sakamaki .............. H04N 5/272 |
| | | 348/E5.051 |
| 2011/0054691 A1 | 3/2011 | Lee et al. |
| 2011/0116682 A1 | 5/2011 | Wang et al. |
| 2011/0144829 A1 | 6/2011 | Kim et al. |
| 2012/0066640 A1 | 3/2012 | Kwak et al. |
| 2012/0093362 A1* | 4/2012 | Liu ........................ G06V 20/52 |
| | | 382/103 |
| 2012/0195471 A1 | 8/2012 | Newcombe et al. |
| 2013/0064432 A1 | 3/2013 | Banhazi et al. |
| 2013/0128034 A1 | 5/2013 | Carr |
| 2013/0249218 A1 | 9/2013 | Vassilev et al. |
| 2014/0144390 A1 | 5/2014 | Duncan et al. |
| 2014/0270378 A1* | 9/2014 | Aimura .................. G06V 40/10 |
| | | 382/103 |
| 2014/0285667 A1* | 9/2014 | Aimura ..................... B60R 1/00 |
| | | 348/148 |
| 2015/0049941 A1 | 2/2015 | Hall |
| 2015/0379740 A1 | 12/2015 | Yang et al. |
| 2016/0055400 A1 | 2/2016 | Jorquera et al. |
| 2017/0172136 A1 | 6/2017 | LaRue |
| 2018/0107904 A1 | 4/2018 | Yang Mao et al. |
| 2018/0114068 A1 | 4/2018 | Balasundaram et al. |
| 2018/0125058 A1 | 5/2018 | Liu |
| 2018/0220641 A1 | 8/2018 | Read |
| 2019/0110444 A1 | 4/2019 | Boehm |
| 2019/0152595 A1 | 5/2019 | Mitchell et al. |
| 2019/0236614 A1 | 8/2019 | Burgin et al. |
| 2020/0323193 A1 | 10/2020 | King |
| 2020/0380678 A1 | 12/2020 | Sugaya |

FOREIGN PATENT DOCUMENTS

| | | | |
|---|---|---|---|
| CN | 107886086 A * | 4/2018 | ......... G06K 9/00724 |
| CN | 109997834 A | 7/2019 | |
| CN | 110063326 A | 7/2019 | |
| GB | 2555836 A | 5/2018 | |
| WO | 2014185780 A1 | 11/2014 | |
| WO | 2015093938 A1 | 6/2015 | |

* cited by examiner

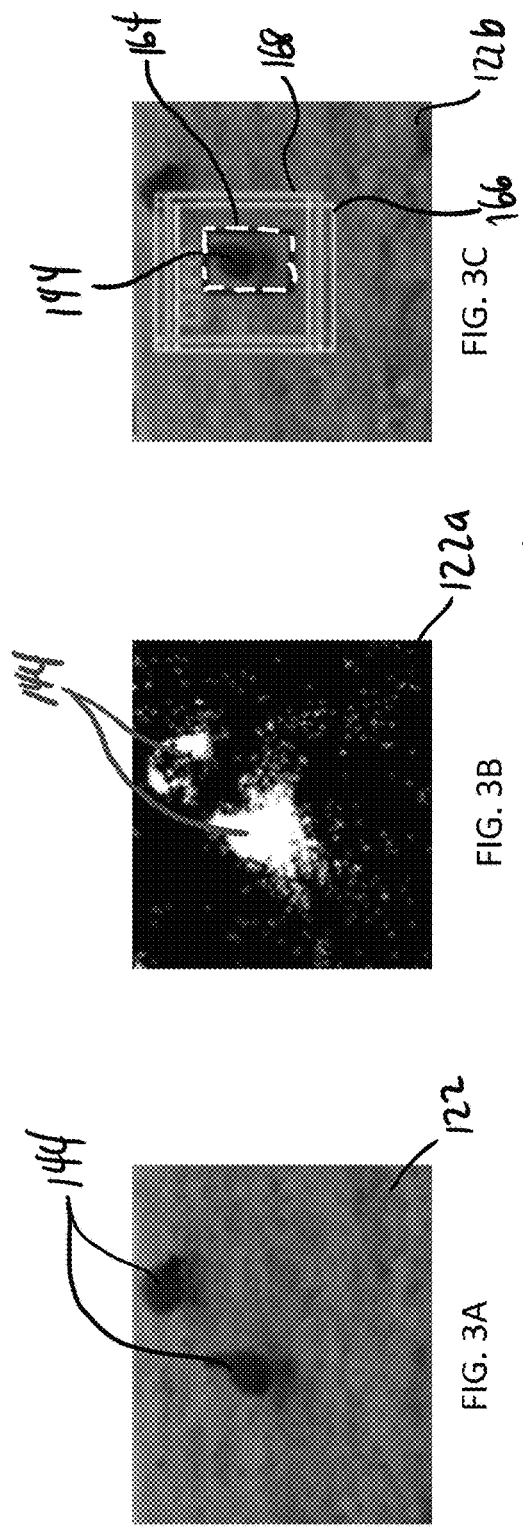
FIG. 3A
FIG. 3B
FIG. 3C
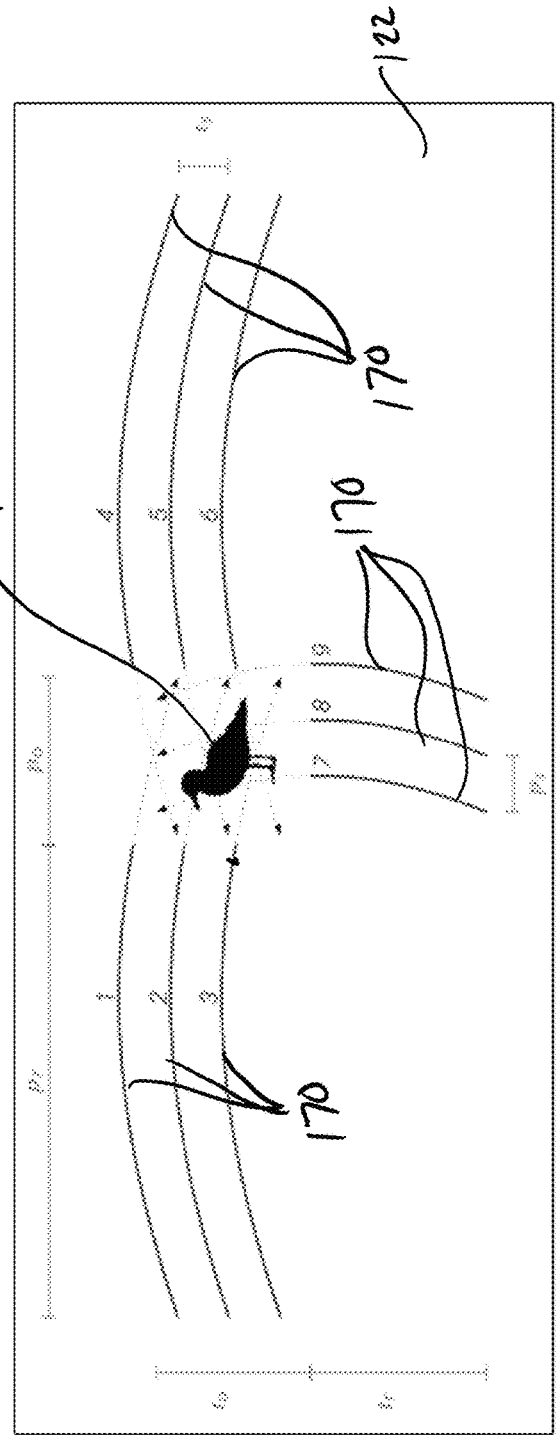
FIG. 4

SYSTEM AND METHODS FOR AUTOMATED WILDLIFE DETECTION, MONITORING AND CONTROL

CROSS-REFERENCE TO RELATED APPLICATIONS

This application is related to and claims priority from earlier filed U.S. patent application Ser. No. 16/682,268, filed Nov. 13, 2019.

BACKGROUND OF THE DISCLOSURE

Embodiments of the invention relate to monitoring wildlife movement patterns, in particular bird movement patterns, and a system and method for automating bird deterrent systems to prevent birds from occupying certain areas of interest, such as airfields and crop fields.

Controlling wildlife is a difficult matter. Prior art in the area of bird control describes devices for automated bird repelling using laser technology which is pre-programmed to repeatedly move along set patterns or scan areas of concern (see WO2015093938 the entire contents of which are incorporated herein by reference). Although these systems have been proven to be effective, they have drawbacks.

SUMMARY OF THE INVENTION

Of particular concern in connection with the present invention is that the prior art systems are without any wildlife or bird detection capabilities. Accordingly, there is no means to do an objective assessment of the bird problem or determine the true effectiveness of the deterrent system. Moreover, without detection capability, the existing systems are not able to adapt to the behavior of the birds. Rather, the prior art system is pre-programmed during installation of the device and does not deviate from the programmed pattern or timing.

Another concern is that the described device also projects the laser when there are no birds present at all, or when birds are positioned at locations other than those at which the laser is pointing. Altogether, this increases the risk of habituation. It also results in unnecessary power consumption and more importantly it increases the risk of shortening the life time of the device.

In summary, the prior art lacks any objective means to measure the extent of the existing bird problem or to measure the effectiveness of the repelling system. Additionally, there is no feedback mechanism implemented to improve the repelling effectiveness, i.e. to adapt the motion of the laser to changing bird occupation habits. And finally, there is no way to efficiently decrease the run time of the laser to improve the durability and lifetime of the laser and other components.

Detecting any type of wildlife poses a great challenge in itself. Many sensors have a limited range or a limited field of view. An example of a limited range/field of view device is a so-called animal trap camera, which uses motion detection to take pictures. The limited range decreases the extent to which such a camera can be used for broader scope wildlife monitoring and control. On the other hand, sensors that can detect at great distances are much more expensive and are not easy to deploy. An example is a long-range radar system to track bird migrations around airports. The mentioned shortcomings of such a bulky system significantly decrease the usability of the detection device for different purposes. In summary, there is no wildlife detection system that has the flexibility to be implemented in different situations, while still being able to detect at larger distances as needed for wildlife measurements and feedback to a repelling device.

The present disclosure describes a system which is able to detect and recognize wildlife, and in particular birds, using camera images. The present solution is comprised of integrated hardware devices, algorithms and software which cooperate to provide an effective and reliable detection and monitoring system. Properly equipped, the system can be made to be portable and can be set up at any location for different wildlife detection and repelling purposes.

An automated wildlife monitoring and control system generally comprises a main processing module which includes a CPU/GPU, user interface, storage/memory and wired/wireless communication, a sensor module for acquiring a stream of sequential images and a control module for controlling a laser or other deterrent device. The sensor(s) gather data (images), which are first processed and then fed to the detection algorithms. The algorithms turn this data stream into object and environment information. Based on this, a high-level state machine (AI software running on the CPU or GPU) will select different machine behaviors for the purpose of monitoring or repelling. Subsequently, relevant commands are sent to the control algorithms and a controller towards the repelling devices in the system.

To adjust the system behavior to different environments and different goals, a system configuration method or protocol is implemented. To perform extensive analysis, a dedicated logging structure is put in place by storing historical images. Lastly, a user interface is provided to adjust a subset of the loaded configuration. This can for example be used for fine tuning of different parameters.

Accordingly, it is an object of the invention to provide an automated wildlife detection and monitoring system which is capable of objective wildlife assessment, autonomous monitoring and repelling of the wildlife, adaptability to changing wildlife patterns, feedback on repelling effectiveness, changing repelling behavior based on monitored wildlife patterns, and creating new or custom repelling behaviors.

It is a further object of the invention to provide a system which is suitable for different environments, which reduces unnecessary power consumption, reduces use with same or better efficiency, and increases device longevity.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

FIGS. 3a-3c illustrate the sequential processing of an image by background subtraction;

FIG. 4 illustrates a targeting deterrent pattern which is effective for repelling wildlife by a swiping approach method;

DETAILED DESCRIPTION OF THE INVENTION

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

The present disclosure provides an exemplary system which is able to detect and recognize wildlife, and in particular birds, using camera images. The exemplary embodiments are comprised of integrated hardware devices, peripherals, and processing devices which run software algorithms capable of processing images, detecting wildlife within the images, determining areas or targets of interest within the images, and creating or adapting repelling patterns or activities based on the detected wildlife. Properly equipped, the system can be made to be portable and can be set up at any location for different wildlife detection and repelling purposes.

Figure 1:
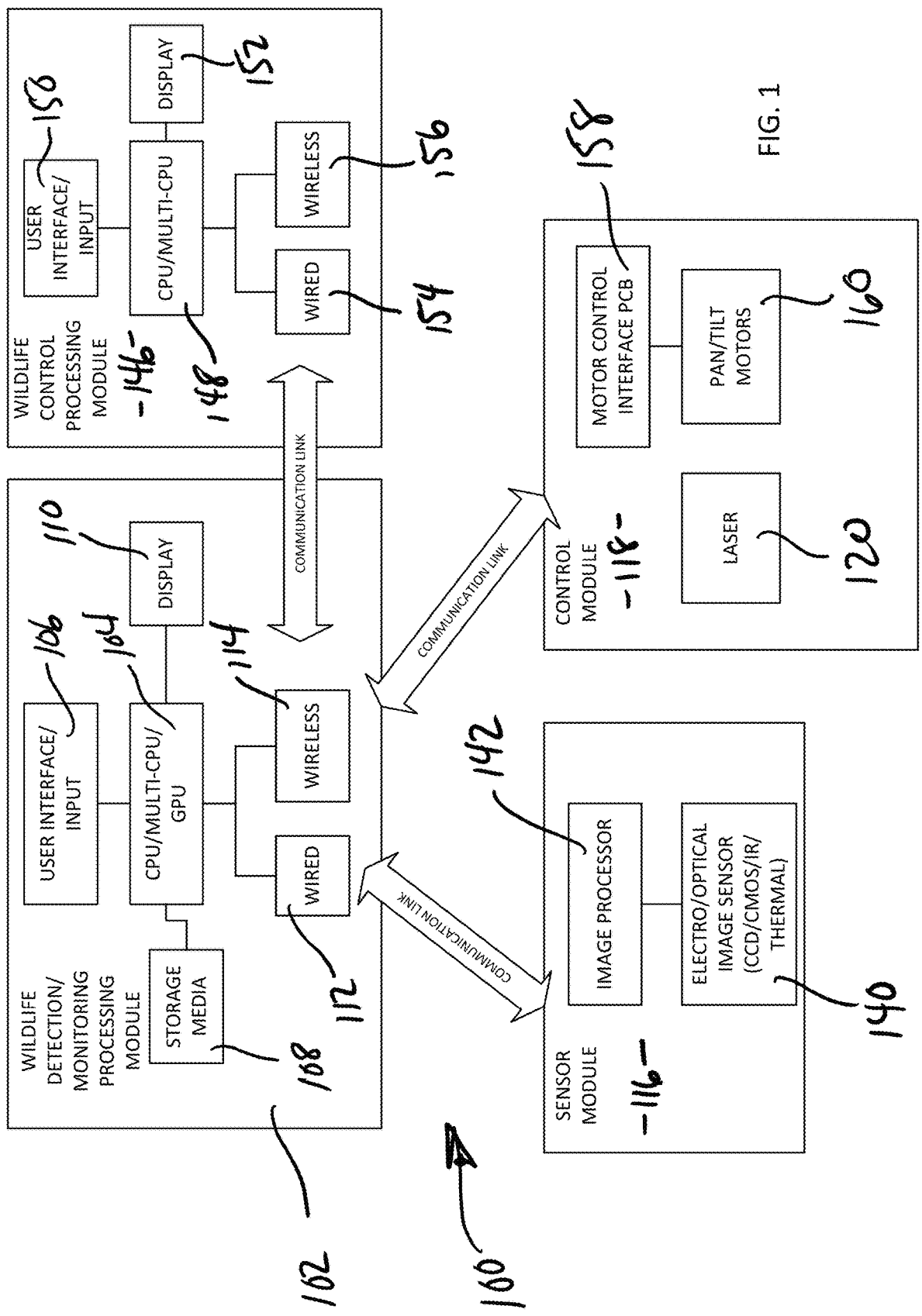
FIG. 1 is a schematic block diagram of the major modules of the present system.
Figure 2:
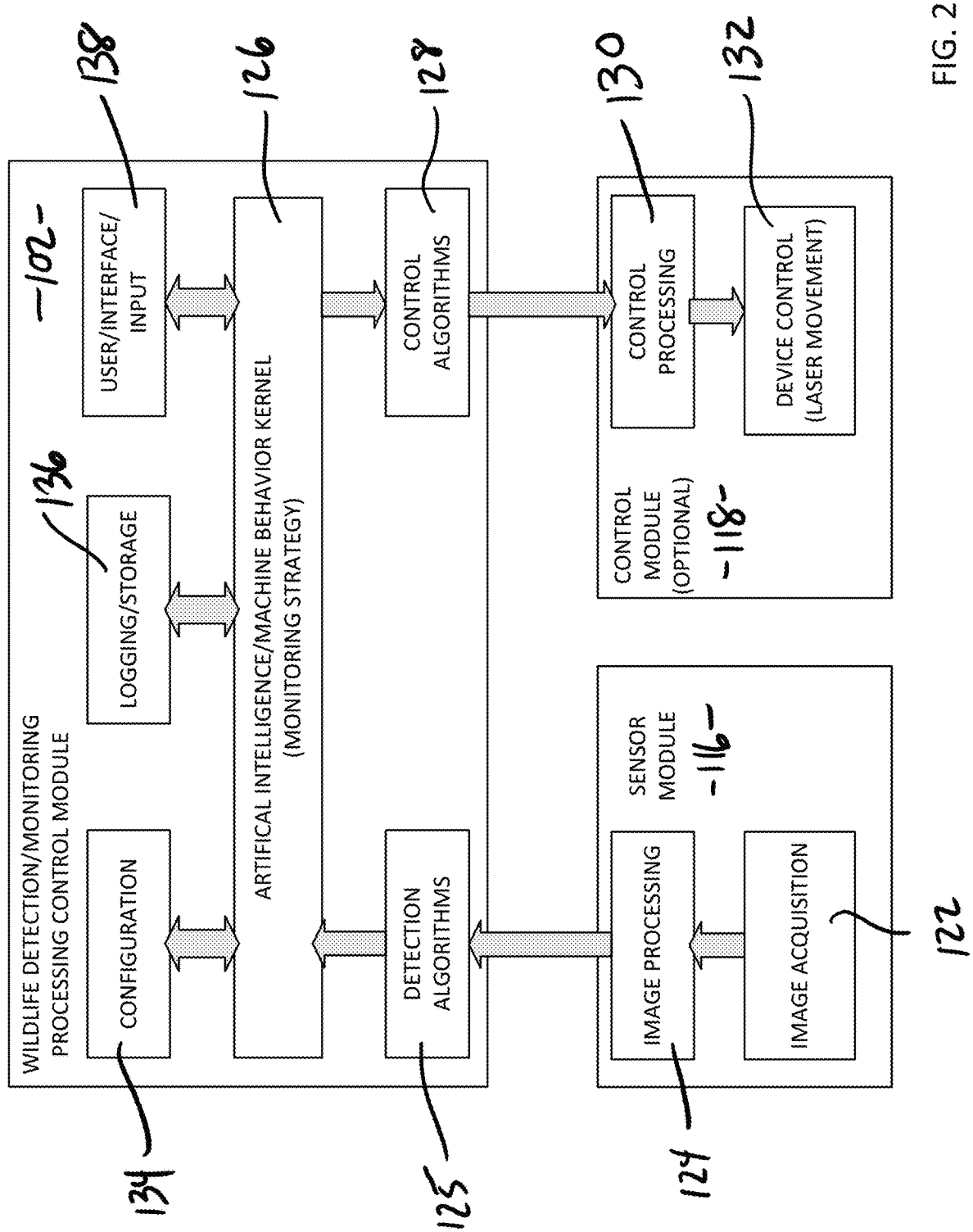
FIG. 2 is a data flow diagram illustrating the input, output and processing of data within the system.

Referring to FIGS. 1 and 2, an automated wildlife monitoring and control system 100 generally comprises a main processing (detection) module 102 which includes a CPU 104, user interface 106, storage/memory 108, display 110 and wired/wireless communication 112,114. The system further includes a sensor module 116 for acquiring a sequence or stream of images 122 and a control module 118 for controlling a laser 120, LED light source, or other bird or animal deterrent device. Referring to FIG. 2 (data flow), the sensor(s) gather data (images) 122, which are first processed (image processing 124) and then fed to the detection algorithms 125. The algorithms 125 turn this data stream into object and environment information. Based on this, the high-level state machine (AT software running on the CPU) 126 will select different machine behavior for the purpose of monitoring or repelling. Subsequently, relevant commands are sent to the control algorithms 128 and a controller 130 with the goal of controlling 132 the repelling devices (such as laser 120) in the system 100.

To adjust the system behavior to different environments and different goals, a system configuration method or protocol 134 is implemented. To perform extensive analysis, a dedicated logging structure 136 is put in place by storing historical images. Lastly, user interface data is provided to adjust a subset of the loaded configuration. This can for example be used for fine tuning of different parameters.

Referring back to FIG. 1, the hardware of the system consists of several modules each consisting of a smaller set of components: sensor module 116, processing module 102 and control module 118.

The sensor module 116 generally includes an optical lens (not shown), an electrooptical image sensor (camera) 140, and an image signal processor 142. Electrooptical image sensors 140 can include CCD, CMOS, Infra-Red (IR), thermal, etc. The lens projects the surroundings onto the image sensor 140 to create a digital image representation of the environment. It is further processed on the image signal processor 142 to improve the overall quality of the digital representation. A camera 140 is chosen for the sensor module 116 because it allows the system 100 to be adapted to different situations at different locations (customers) by swapping specific components. By choosing a thermal imaging sensor, for example, viewing capabilities during nighttime are enhanced. By selecting the proper lens and sensor resolution, detection at various distances is easily customized. Additionally, these types of imaging sensors can be easily mounted on an actuator such as a Pan and Tilt Unit to be able to cover all the surroundings and not be limited by the natural field of view of the lens system. In other embodiments, the imaging sensors may also utilize the input of a moving mirror which reflects the image of the surroundings onto the sensor.

For optimal performance, each situation needs to be individually assessed and the most suitable sensor and lens should be selected based on this assessment. This assessment includes the environment, as well as the type and size of wildlife intended to be detected and monitored. By optimizing optical and digital zoom functionality, the system can focus on selected targets such that the animal covers enough pixels on the image sensor to be detected as an animal instead of a blur or a dot. Additionally, the dynamic range of the image needs to be sufficient to be able to obtain a high level of detail on the image even during low lighting conditions. The processing unit 142 should always allow for (automatically) adjusting the gain, exposure time and white balance. Also, the processing unit 142 should be capable of selecting a Region of Interest (ROI) within the image to exclude regions of the image sensor during detection and to scan different regions of the image sequentially.

The following decision strategy is adopted to adapt the sensor module 116 to the use case.

1. Monitoring in real time?

Yes: global shutter (image sensor which scans the entire area of the image simultaneously.

No: rolling shutter. (image sensor which scans the image sequentially from one side of the sensor (usually top) to the other, line by line)

2. Monitor complete surroundings?
Yes: mount detection system on moving base.
No: mount detection system on fixed base.
3. Monitor during night time?
Yes: use a LWIR type image sensor (thermal vision).
No: use a CMOS/CCD type image sensor (regular vision).
4. Monitor during low light conditions?
Yes: maximize dynamic range.
No: no additional dynamic range requirements need to be added.
5. Monitor during low light conditions?
Yes: Monochrome sensor
No: Color Sensor
6. Must the interface be compatible with the default detection system hardware?
Yes: USB2/USB3/Gigabit Ethernet/CSI-2 should be used.
No: FireWire/CoaXPress/Camera Link are optional.
7. Does the monitoring system have a fixed based or rotating base? Is the monitoring area far away or nearby?
Fixed base and nearby: lower resolution and higher angle of view.
Fixed base and far away: higher resolution and higher angle of view.
Rotating base and nearby: lower resolution and lower angle of view.
Rotating base and far away: higher resolution and lower angle of view.
8. Do the implementation have a stage one or stage two pipeline?
Stage one: min 20 fps framerate
Stage two: min 5 fps framerate Still referring to FIG. 1, the processing module 102 comprises a processing board containing one or multiple processing units 104, a user interface (input) 106, display 110, wired and wireless communication ports 112,114, and storage/memory media 108, such as a hard drive or SD card.

The processing module 102 uses the data from the sensor module 116 to detect and recognize objects (birds 144) on the images 122. It can be configured to run several detection algorithms 125, to process data from different types of sensor modules 116 and to demonstrate different types of monitoring and repelling behavior. It contains a logging structure to save detection results and it includes a user interface to adjust the parameters. Lastly, it implements the wildlife detection software, but it can also implement the monitoring behavior, since it is available not only in hardware (normal situation) but also as software plugins which can be loaded if the configuration so requires.

Figure 9:
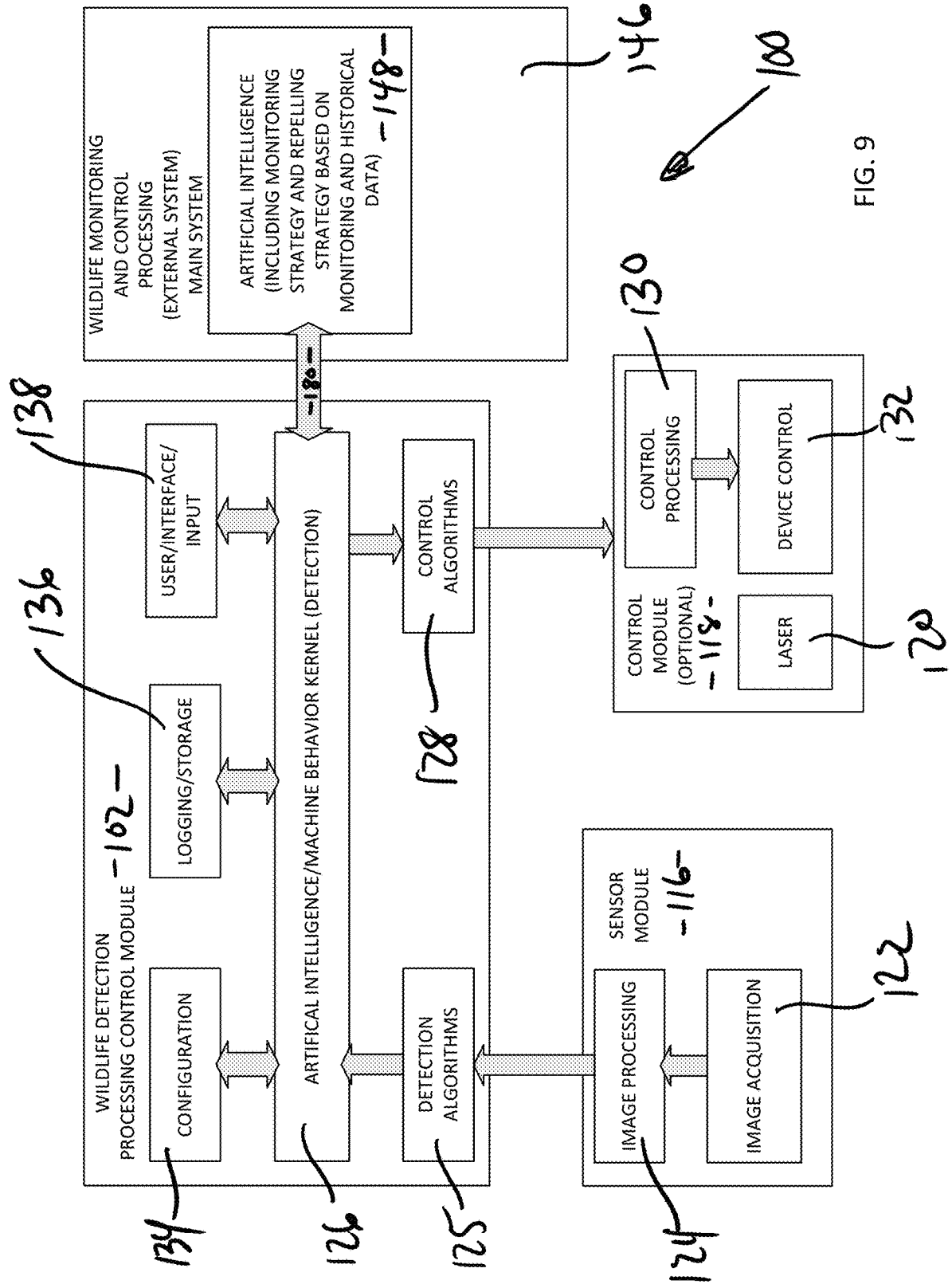
FIG. 9 is a data flow diagram of a standard wildlife detection configuration where the sensor/processor modules are implemented as an advanced sensor in an otherwise autonomous repelling system.

Wildlife control software is implemented on an external agent 146 with which the detection system 102 communicates. The external agent 146 comprises a separate hardware device having its own CPU(s)/GPU(s) 148 running its own software and algorithms for creating new and/or adapting existing repelling and control schemes. The external control agent 146 has its own user input 150, display 152, wired and wireless communication interfaces 154,156 for communicating with the detection and monitoring system 102. See FIGS. 1, 9 and 10. Referring to FIG. 9, the Wildlife Control System (external agent 146 functions as a separate AI platform that analyzes monitoring data and develops control schemes which can then be provided to the localize wildlife control hardware 118.

The hardware of the processing module 102 comprises a Printed Circuit Board (PCB) containing a single or multi-core CPU (or even a multiple CPUs) and as well as one or more GPUs (104) to execute different algorithms 125 for detection (singular, sequentially or in parallel). It has various wired/wireless interfaces 112, 114 for connecting the camera 140, including Gigabit Ethernet, USB3 and MIPI CSI-2. This allows the processing module 102 to be generic and independent of the type of camera 140 that is chosen for the particular situation, as described earlier. For external communication, there is a Universal Asynchronous Receiver/Transmitter (UART) and several General Purpose Input/Outputs (GPIOs) available to support the different modes of operation as will be discussed later. There is an on-board Real Time Clock (RTC) with backup battery for time keeping purposes. This enables the module 102 to keep track of time, even when the power is lost. The correct and up to date time enables the use of scheduled tasks and keeps the timestamp used in all logs correct and in sequence. This enables true and more precise logs for analytics and debugging purposes. Lastly, an HDMI and USB2 interfaces are present for, input, debugging, display and demonstration purposes, enabling human machine interaction (HMI).

Two optional extensions are also possible. Firstly, a wireless connectivity chip can be connected to provide the system with WiFi, 3G or 4G connectivity. Moreover, the Gigabit Ethernet connection is available for connectivity if, for example, a camera was selected using a USB3 interface. This provides the detection system 100 with the possibility to be configured and send logs over a larger distance. Secondly, a storage media (hard drive, SSD storage) 108 is provided for extensive logging and data collection.

The control module 118 generally includes a control processor 158, motor controller(s) or actuator 160, and a repelling device, such as a laser module 120 or audio device (See FIG. 10) or other animal or bird repelling device. The exemplary controllers 160 also include sensors for feedback control. The control module 118 consists of the necessary actuators and devices to perform wildlife control actions. Because of the different means of external communication provided by the processing module 102, different types of wildlife control can be triggered by the processing module 102, depending on the specific goal at an end-client. These modules 102, 116, 118, 146 can be connected over a wired or wireless connections and can be in close proximity or further away depending on the desired setup at each specific location.

Figure 8:
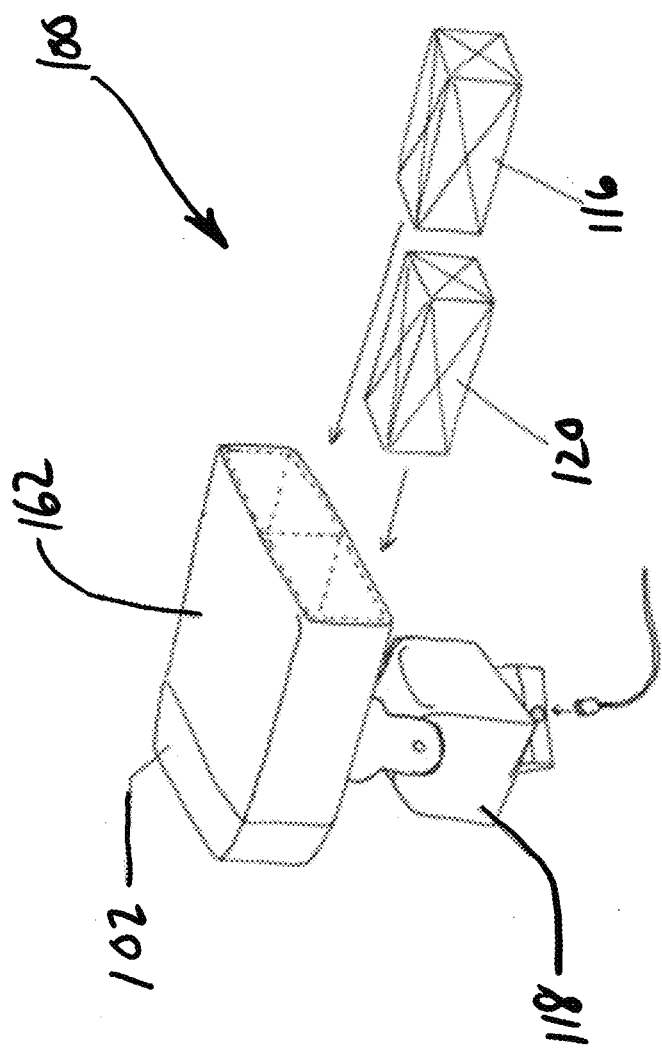
FIG. 8 is a perspective view of an exemplary integrated modular system where individual modules are interchangeable within a payload housing.

Referring to FIG. 8, the exemplary detection and repelling system 100 comprises a multi-axis actuator and controller 118. A laser module 120 is mounted inside a payload housing 162 for bird repelling. Inside the same housing 162, the detection system module (camera sensor module 116) can be mounted to monitor the complete surroundings. Alternatively, it is possible to trigger other external wildlife control modules, such as audio devices 184. Both modules 116, 120 are connected to a processor module 102 integrated as part of the payload housing 162. Either way, communication is performed (1) by triggering one or more GPIOs or (2) by implementing the required protocol over UART, possibly aided by an RS485 or RS232 chip or any communication protocol over some to be added module like a USB dongle implementing any kind of communication which facilitates the proper communication with the other device.

Figure 10:
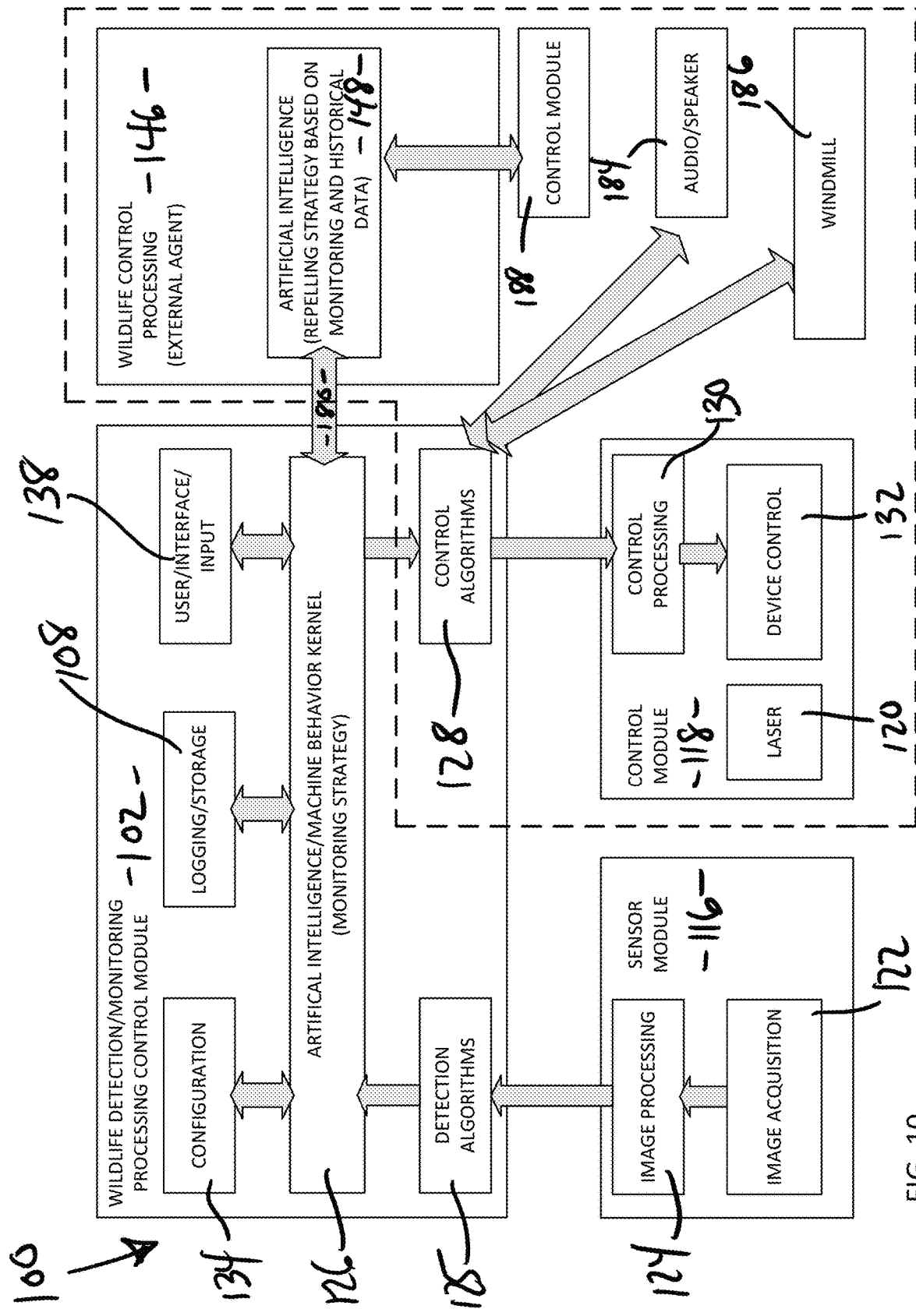
FIG. 10 is a data flow diagram where the monitoring and repelling system is maintained separate from the wildlife control software (external agent—state machine).

These modules represent different sections of the system, and representations of these can seen in the system overviews (See FIGS. 2, 9 and 10). By making adjustments to an individual module, the functionality and overall performance of the system 100 can be significantly different, to accommodate for the different environments the detection system will be operating in.

Wildlife Detection Software

The wildlife detection software has multiple goals. Firstly, it is used to count the number of animals and species within an area or within a certain time frame. This can be used for counting as its sole purpose and for the benefit of animal tracking by (government) organizations. Based on this, an objective measure can be made of the animal activity and the potential hazard or nuisance caused by these animals. Secondly, it is used to perform real-time wildlife control, by providing detected animals as a feedback mechanism for wildlife control devices. Thirdly, the detection software can be used to measure the effectiveness of such a wildlife control solution. Based on this, the solution can be optimized to achieve the desired effect. This all is an integrated part of the detection system and each, or multiple, of the goals can be activated during configuration depending on the need at that time, determining the end behavior of the system.

For the first goal, in order to determine the situation at a potential (client) location the detection system can be deployed by itself to paint a picture. This picture can be used as input to further analysis and predictions like estimated savings when using the repellent device or in general give the client a quantified description of the (potential) problem. To be able to provide this, a logging structure is in place, as will be elaborated upon later.

The second goal is the most complicated application and requires communication between the detection software and the wildlife control software (See FIGS. 9 and 10). The detection software provides communication triggers based on which a wildlife control strategy will be implemented, these communication triggers and strategies are discussed below.

For the third goal, the same measurements and logging can be used as for the first goal, but implemented during the wildlife control period. By using a storage media and connectivity extensions, the end user, or an installation consultant (manufacturer), can monitor operation and results and act as a supervisor of the system. It allows the end user and/or consultant to actively review system effectiveness and change the high-level parameters of the wildlife control strategy, based on the measurements, and tune them until the desired effect is achieved. These changes can be made on-the-fly or after retrieval of logs, data and processing thereof. The wildlife detection system acts as a quantified feedback in this case.

Monitoring Strategy

The detection software achieves these goals by implementing a monitoring strategy, that determines how and when to survey different sections of the environment. A monitoring strategy will, depending on the situation, consist out of 1 or more or a combination of the following three survey methods:

1. General survey
2. Waypoint survey
3. Active scan survey

A general survey provides an overview of the environment by capturing one image that covers a part of the surroundings. This strategy is often used for situations where the system either is mounted on a fixed base, or for small areas where one camera can capture everything of importance.

The waypoint strategy uses specific waypoints, where each waypoint provides an overview of a small section of the surroundings. The system stays at each waypoint for a certain timeframe and if nothing of interest is detected or if a certain timeframe has passed the systems moves on to the next waypoint. Effectively scanning and monitoring a larger area, one part of it at a time.

The final survey strategy is the active scan survey, where the surroundings are surveyed by constantly scanning through the environment. How the surroundings are scanned can be configured to best fit the situations. Additionally, the active scan survey can also be used to scan a subsection of the environment, which provides the possibility for the system to create priorities for certain areas that would be classified as hotspots. Additionally, this allows the system to monitor while the platform is rotating, and therefore this survey method can be used while a pattern is displayed by the system. One way of implementing this is by using the waypoint strategy but upon reaching the waypoint immediately move on to the next one.

These surveys are used independently to perform wildlife counting (the first goal as previously mentioned). But note that, when performing wildlife control as well (the second and third goal), this monitoring strategy is mixed with a repelling strategy. These three different surveys can then be used to define strategies that allow the system to determine the most effect repellent strategy. An example strategy would be to use the active scan survey to survey the area. When the system detects an object of interest, the system switches to a general survey and stays in the orientation it was when the object as detected, until the object is deterred. When an object is detected, the current orientation of the system can be stored as a waypoint that the system can return to determine if the object of interest did not return and thus determine that the repellent actions was successful.

Object Detection

The goal of the detection system setup is to be flexible. It should be able to serve the multiple goals that were defined previously, but it should also be able to work in different environments with different cameras and other sensors and at different distances. Therefore, a configuration protocol is provided. This protocol executes upon start-up and configures the detection pipeline, including the models and parameters that are to be used.

Two major configurations exist that can be individually tweaked. The first aims to be deployed in (partly) unknown environments and primarily makes use of unsupervised learning. The second aims for a higher accuracy in known environments and uses supervised learning. Very often, the second follows the first, by simply performing a configuration update once the environment is better understood.

An unknown environment is defined as follows: a type of environment where no previously recorded relevant footage is present in the database. This means a deep neural network is not able to be trained for that particular situation since the required training data has not yet been gathered. It is partly unknown if the expected animals and objects to be encountered are already known. On the contrary, a known environment is one where appropriate footage has previously been obtained for training and has been annotated. This means that the first detection pipeline is often used to efficiently gather the required footage to set up the second detection pipeline.

This configurable two-stage approach is the essence of the whole detection system. It allows us to be flexible and provide value even when the environment is unknown and no model is available of the animals and environment on site. However, thanks to the storage media and connectivity extensions, it is still possible to adapt to the situation and achieve a greater performance in the future.

Detection Pipeline; First Stage

The stage one detection pipeline consists of multiple steps:
1. Background subtraction.
2. Morphological image processing.
2a. Erosion.
2b. Dilation.
3. Object detection.
3a. Contour detection.
3b. Bounding box conversion.
4. Object suppression.
4a. Non-maximum suppression.
4b. Suppression by size.
4c. Suppression by amount.
5. Classification (optional).
5a. Generate local search area.
5b. Sliding window classification.
6. Flock detection (optional).
6a. Clustering.
6b. Model fitting.
6c. Grouping.
6d. Group classification.

The first step is an unsupervised learning method called background subtraction. Using a sequence of successive images, the background subtraction method is able to separate the image in a foreground and a background mask, under the assumption that the background in the images is invariable over a certain amount of time. Specifically, a model is built for each pixel representing the probability of that pixel's value over a certain period of time. If the new value of that pixel differs significantly from the current model, it is signified as belonging to the foreground mask. It is assigned to the background mask otherwise. Specifically, a custom implementation of the Vu Meter background subtraction algorithm is implemented using a non-parametric background model. In this regard, a mask is provided that tells the algorithm where to operate and where not to operate, in order to ignore certain regions of the image. There are several benefits of using this algorithm for wildlife detection.

It is able to detect small changes, but it still produces much less noise than simple frame differencing. This is ideal for long-distant detection, as far away objects appear small in the image.

It is also computationally not very complex and particularly suitable for parallelization. It is therefore implemented in parallel on a GPU using CUDA (CUDA is a trademark of NVIDIA Corp.) and executed using an asynchronous kernel launch. CUDA is a parallel computing platform that lets developers execute code in parallel on a GPU via an API in different languages. Kernels are functions that are executed in parallel on the GPU (the device) and launched via an instruction from the CPU (the host). When launched asynchronously, control returns to the CPU immediately. Because of this implementation, the algorithm can process much larger resolutions in the same time as similar background subtraction algorithms. It allows the system to perform real-time detection on large resolutions. This is ideal for wildlife monitoring, because larger resolutions allow permit the system see more, as discussed previously.

The second step consists of (a) erosion and (b) dilation, two morphological image processing steps in order to decrease the amount of noise. These can be tuned for a particular situation. For example, when noise is expected due to for example moving vegetation, larger kernels are used to filter out most undesired movement in the environment. Otherwise, when less noise is expected because the environment is more static, a smaller kernel is used and can pick up more distant objects. Note that in this context a kernel refers a matrix that determines how the system shrinks (erosion) or grows (dilation) shapes in an image.

The third step is object detection. This is performed via (a) a contour detection algorithm, after which (b) the contours are converted to bounding boxes.

The fourth step is object suppression, consisting of several configurable steps. First, (a) non-maximum suppression merges overlapping bounding boxes. Then, (b) a limit on the object size is posed and (c) on the total number of objects. The latter two steps can be tuned similar to the morphological operations, to allow for more or less distant objects to be detected, in exchange for less or more noise.

For the fifth step, (a) a local search area is generated around the detected objects within which the system (b) performs a sliding window detection scheme. In particular, a Support Vector Machine is used with a Gaussian kernel. It is a binary classification, with the sole purpose to distinguish the expected animal (bird, boar, etcetera) from surroundings (vegetation, clouds, etcetera). Here, the kernel refers to a function that is used to express the similarity between two of its inputs. This step is optional. Only if the environment is partly unknown, a model is trained using data gathered from (online) database in order to enable classification. And only if the expected object distances are not too large, classification is used to separate objects of interest from its surroundings.

The sixth step, firstly (a) performs k-means clustering to find k clusters of detections. Then, (b), a model is selected and fit to a probability distribution around the clusters. This model can be a uniform or a Gaussian distribution. Based on this model, (c) the distance from the cluster center k is determined for each detection. Using the selected model, this distance gives the probability of a detection belonging to the particular cluster. If above a set threshold, the detection is added to the group. Then, (d) the detection is classified as a group if at least n objects belong to the group. This procedure is repeated for different numbers of k. This step is also optional. Only if the expected distances are large, it is used to separate groups of animals from background noise. It allows the system to see more distant objects by relying on the fact that animals often appear in groups.

Referring to FIGS. 3a-3c, an exemplary background subtraction is illustrated. The original image 122 is shown in FIG. 3a, the background subtraction result 122a in FIG. 3b, and the classification result 122b in FIG. 3c. In FIG. 3c, the inner dashed bounding box 164 is the result from the object detection, which survived the suppression step. The white bounding box 166 represent the search area and the gray bounding box 168 represents the detected object.

Detection Pipeline; Second Stage

The stage two detection pipeline consists of a single Convolutional Neural Network (CNN) for object detection. It uses a standard network architecture for object detection and it is trained using transfer learning. Specifically, state-of-the-art You Only Look Once (YOLO) object detection architecture, implemented using the darknet framework for neural networks, is utilized.

For transfer learning, at least 1000 images are used for each class that is desired to be detected. Images are obtained from the intended imaging hardware or a better camera set-up at the intended or similar environment. Pre-trained model weights are taken for most of the convolutional layers, and the remaining output layers are trained. The size of the layers is adjusted based on the number of classes that the system is intended to predict.

Ground truth labelling is performed on the level of individual objects, no matter how small. As long as a trained human eye can reasonably well determine the animal species, it is provided with a label. Distinct animal species, and not animal family names are used, based on an available database of species. The human "trainer" is allowed to determine the type of species based on indirect evidence. For example, suppose an unknown species of gull appears in an image. Then, if a certain species of gulls is more common on a geographical location, the gull can be labelled as such.

Additionally, flocks of wildlife can be detected in a similar fashion as during the first detection pipeline. To do so, a sixth step of the stage one detection pipeline is applied on the human labelled data for each species. This allows us to automatically generate labels for groups (flocks) of animal species. This is particularly powerful if, as explained, labelling is performed on even the smallest objects that are able to be distinguished based on direct and indirect evidence. The species' group will then become a separate class in the object detector.

Object Localization

Object localization consists of a three-step approach. The output of each of the steps is used for different wildlife control actions as shown later.
1. Object position in image coordinates.
2. Euclidean distance from camera.
3. Object position in world coordinates.

The first result is obtained from the output of the detection pipeline by taking the center coordinates of the bounding box in the image. If the first detection pipeline is used, the Euclidean distance is determined based on the object size and geometrical properties of the camera and the surroundings. In case of the second detection pipeline, the Euclidean distance is computed using nonlinear regression, conditional on the object class. It takes the bounding box size and the object class as inputs and predicts the Euclidean distance. The third result is obtained via forward kinematics, using the known current orientation of the camera.

Communication

The information that is passed from the detection software to the control module is based on results from the algorithms. When an algorithm identifies an object of interest, different information about that object is gathered. The system can be configured such that each type of information can result in a trigger towards an external agent. The triggers have a certain priority over others triggers. Based on these priorities, the final implemented strategy is determined by the wildlife control software. The detection software can provide the following triggers:

Object detected (yes/no)
Object class (species or other object details)
Object number (number of objects)
Object location on image (pixel location)
Object location on image (object distance)
Object location on the monitoring area with respect to monitoring system (x,y)
Object is moving/stationary
Object direction of movement
Object predicted trajectory
Object past path/trajectory
Event based on previous triggers, combination of triggers or recurring triggers.

Wildlife Control Software

For wildlife control, a strategy needs to be implemented based on the environment the system operates in. The prior art WO2015093938 describes an approach where the system is manually taught a sequence of waypoints that constitute a pattern which is executed during pre-programmed (set) times of the day.

For this detection system a control strategy can be implemented either manually or automatically. The manual implementation is still based on prior art, while the automated strategy adds to this by adapting the manually implemented waypoints or implementing a more complex method.

Adapting Manual Strategies

Overall, a large number of strategies can be defined by combining different actions to different triggers. This can be done manually upfront. However, thanks to the logging and analysis approach, as will be explained in the next section, selecting the strategy is particularly effective to do periodically. It allows for a large degree of customization, tailored for the particular customer. Below are several examples.

Playing a laser pattern in a hotspot area more often than in other areas.

Playing a more intense laser pattern with more waypoints in the hot spot areas.

Playing only laser patterns in the hot spot areas and disregarding other areas.

Playing the most efficient pattern at night, or in situation with bad visibility when the camera cannot detect, based on bird presence hotspots recorded during the daytime.

The automated system can adapt the manual installed pattern of waypoints using triggers from the detection software in addition to data from the logging analysis in one of the following ways:

Adapting Waypoints

Determine the pattern that covers the location of the object of interest and play it Adapt the waypoints of a pattern to the situation based on recurring locations.

Rearrange the order of the waypoints.
Delete unnecessary waypoints.
Add new waypoints.
Adapting timeslots
Add new timeslot to existing pattern.
Remove time slot from existing pattern.
Change time slot duration.

Custom Automated Strategies

In addition to the manually installed control strategy the automated wildlife control software is also capable of generating more complicated strategies.
1. Generate pattern based on one object location.
2. Generate pattern based on multiple object locations.
3. Generate pattern conditional on object class (species, for example).
4. Target objects directly, one at a time until object has been deterred.
5. Target objects by swiping from different directions.
6. Vary laser intensity.
7. Vary projection speed, color, and strobe pattern.

Note that the object location can be expressed either in pixel coordinates, distance or world coordinates.

Each of these strategies basically uses one parameter of either a pattern, object information or other system parameters. Additionally, the generated patterns look very different from the manually implemented patterns. The manual patterns aim to most effectively cover the environment due to the lack of feedback, however, the automated patterns have a different goal. The goal for the automated patterns is to most effectively deter the object of interest. Strategies 1 through 4 generate custom patterns and can look very different each time a pattern is generated. They can even consist of several smaller patterns that converge around a location (example 1), or a pattern that covers an identified hotspot and generates patterns based on the identified class of the object (example 2)

Example 1 (FIG. 4)

The detection pipeline provides a location trigger and the system 100 is configured to target an object 144 directly and create any number of custom swipes 170 from any direction towards the location of the detected object 144.

Because birds respond to the approaching laser projection, it should be clearly visible, and it should be clearly approaching. These patterns are parametrized as shown in FIG. 4. All pan and tilt swipes have a configured pan and tilt range (Pr and Tr), pan and tilt overshoot (Po and To) and pan and tilt spacing (Ps and Ts). The last parameter is the projection speed, at which the laser moves over the surface. Based on the laser orientation, inverse kinematics is used to determine the speed at which the actuator motors should move to achieve the set laser projection speed.

Figure 5:
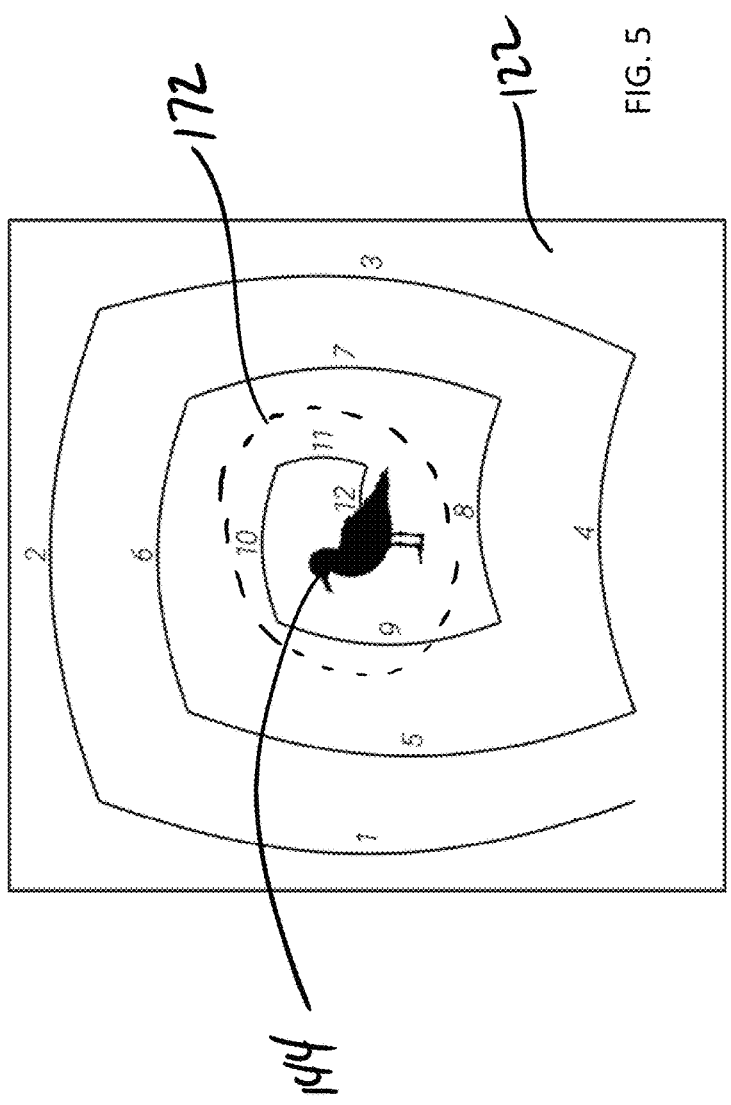
FIG. 5 illustrates a targeting deterrent pattern which is effective for repelling wildlife by a custom hotspot spiral approach method.

Example 2 (FIG. 5)

The detection pipeline provides a class trigger (as an example a seagull 144) on a location identified as a hotspot 172 and the system 100 was configured to create a custom pattern with different laser intensity, due to it being a hotspot.

Due to the class being a seagull it is necessary to increase the laser intensity. Additionally, a custom pattern that covers the hotspot will be played, the hotspot area is bounded by the outer box in the image below.

For the lines 1-12 the laser intensity will be increased each time it moves on to the next line. This will cause the intensity to be highest when the laser reaches the location of the detected object.

Other Implementations

Because of the comprehensive set of triggers, it is also possible to determine repelling strategies based on a specific target, such that each individual bird will be targeted by the laser repelling device with a strategy that is known to be most effective. The pattern which is most effective depends on the species, time of day, season and geographical location and is left by a bird deterrent expert to decide and configure. The device is then able to verify if the dispersal strategy was effective and continue targeting the bird until it has been dispersed. With direct feedback of the camera images, the system can determine the effectiveness of many different dispersal strategies. The system can give objective measurements of animal activity, allowing verification of different strategies for different species. Even environmental factors or seasonal factors can be taken into account, for example bird migration season or mating season or time of the day.

This means it is also possible to target only specific species or avoid specific species. For example, on a poultry farm it is very unwelcome to have migrating birds nearby, because they can carry all kinds of unwanted disease like avian influenza. This potentially means the whole farm can get infected, with the consequence of having to kill and destroy all the poultry at the farm. Obviously, this has a huge impact on the farming operation, therefore most farmers put a lot of effort in preventing their poultry from getting infected. If the system is installed to be targeting all birds except for the chickens, this would have a huge benefit for the poultry farmer.

Once an object is detected, it is important to take the correct action. Once an animal that is on the "protected" list is recognized, the system cannot activate the laser deterrent. Recognizing a bird or other animal that is on the "wanted" list results in the laser deterrent activating and going into repelling mode. If a situation occurs where both are recognized (an object on the "protected" list and an object on the "wanted" list), the system will look at the priorities of the recognitions. These priorities are always in favor of protecting whatever is on the "protected" list, and thus the laser deterrent will not activate.

Logging and Analysis

Because the many captured images together take up a lot of digital storage space, it is important to have an efficient data handling and storage system. The stored files then need to be processed to improve the detection system. This allows for a feedback loop towards the detection and repelling strategies.

Logging Approach

The primary goal of the logging structure is to get a measure of the animal activity in the environment. This requires data about which type of objects are detected at what time and on which location. Furthermore, for efficiently building a database using the first detection pipeline, storage is required for the recorded images. As a secondary goal, the detection performance can also be evaluated.

Figure 6:
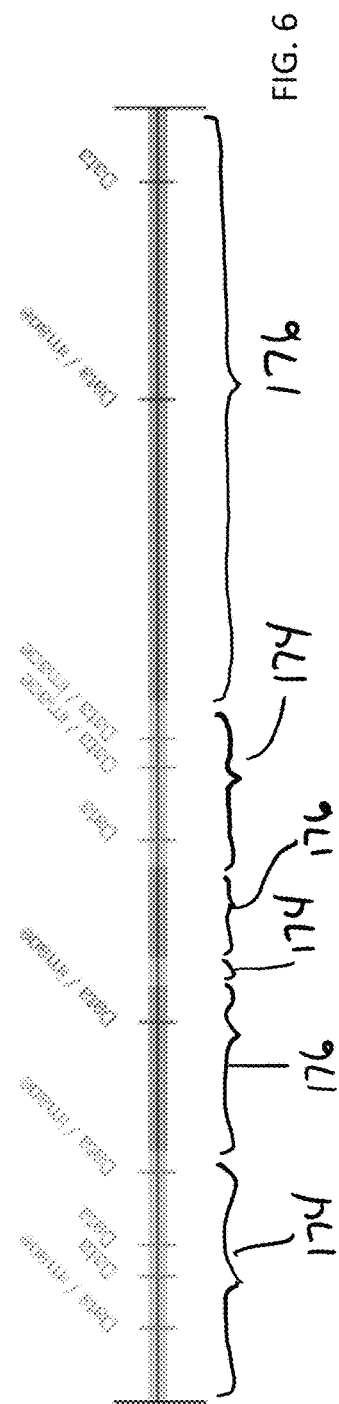
FIG. 6 shows a linear timeline of image acquisition logging based on the presence of objects of interest.

To achieve both goals, the logging is divided in two states: a state when an object of interest is detected (indicated in lighter gray) 174 and a state when no object of interest is detected (indicated in darker gray) 176 (See FIG. 6). In each state, sampling is done with predetermined sampling rates. That is, according to a predetermined uniform probability distribution. This means that data and images are not generated for every instant when an object has been detected. Instead, they are sampled at random, with a rate as defined through the configuration. By sampling, less data is generated. Though, by doing it at random, the data can still be used for an honest evaluation of the detection performance. And, if the sampling rate is high enough, there is still a high enough resolution for evaluating bird activity throughout the day. For evaluating the detection performance, sampling is also performed when nothing is detected. Note that this rate can be significantly lower than the detection sampling rate as most of the images grabbed by the camera will likely not contain an object of interest. Lastly, the logging rate of images and other data can be set separately. However, it is conditional on the data sampling rate to ensure each image contains data (but not the other way around). In summary:

Object Detected:
 a. Sample data at random with sampling rate S1.
 b. Sample images conditionally, according to S1*S2.
No object detected:
 a. Sample data at random with sampling rate S3.
 b. Sample images conditionally, according to S3*S4.

Where for example S1=1/100, S3=1/10000, and S2=S4=1. This allows the sample rate of images to be set relatively high during the first detection pipeline when the database is being built for the tailor-made model, and turn it down afterwards.

Analysis Approach

The data and image logs are post-processed externally, after retrieving data from the hard drive extension or after receiving the data via the connectivity extension. Note that, if the logs come from the first detection pipeline, the second pipeline needs to first be trained and then used to process the logs. Then, because the number of objects is known as well as their type and their location, two main components can be generated for analysis.

1. Wildlife activity timelines.
2. Wildlife activity heat maps.

Wildlife Activity Timelines

Wildlife activity timelines express the number of birds averaged over a time interval. The time interval can any time interval which suits the reporting purpose. Additionally, several different time intervals can be compared to one another to determine the effect of a certain strategy or change in strategy. The timelines also provide a tool to represent the wildlife activity around the system for human interpretation.

Wildlife Activity Heatmap

Wildlife activity heat maps visualize the amount of wildlife active on different locations, averaged over a time interval.

Figure 7:
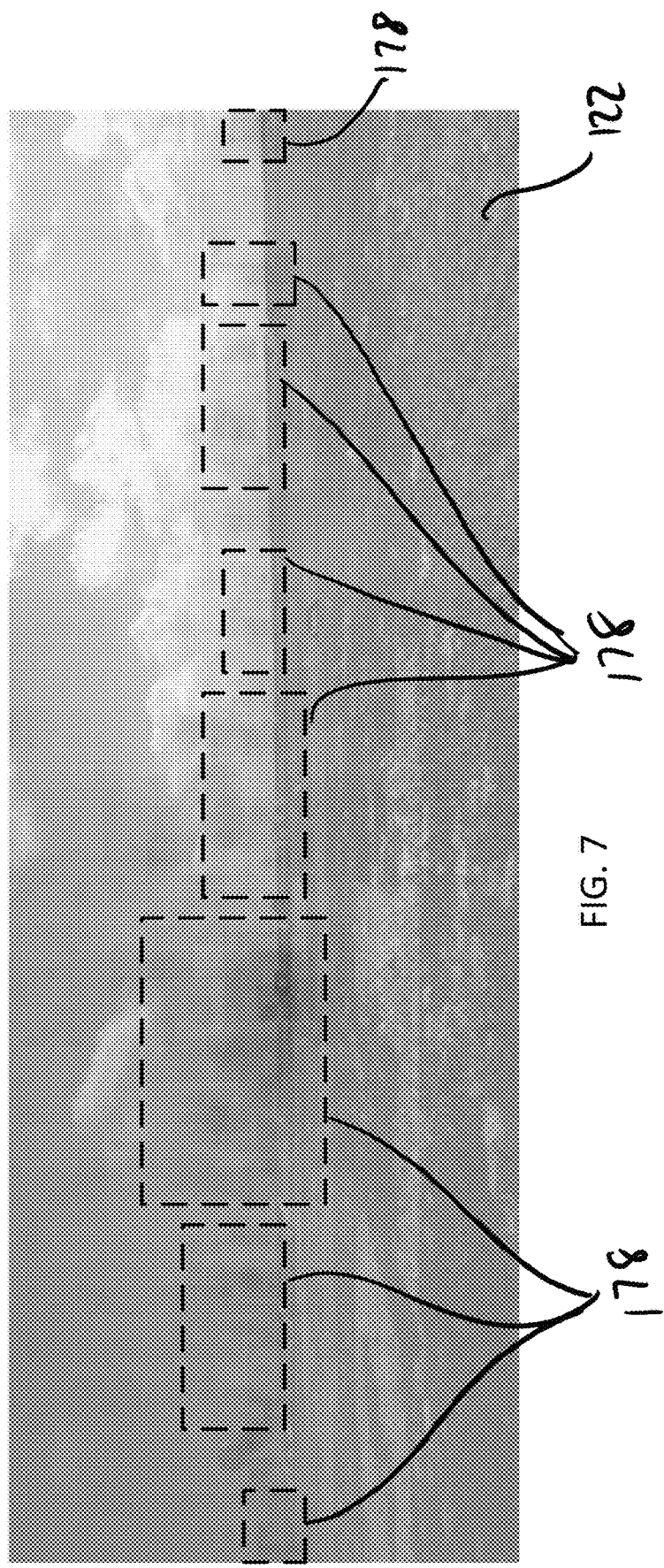
FIG. 7 is a wildlife activity heat map overlaid onto a static image of the monitored area showing localized areas of interest.

Illustrated in FIG. 7 is an example of a heat map, displayed on top of an image 122 taken by the detection system 100 at a customer site. Such a heatmap can be used to indicate the areas (enclosed in broken lines) 178 where, in this particular case, most birds reside. An action can be formulated by a bird control expert to deter at or around that specific location. A trend or migration of the area with the highest concentration of birds can be determined and subsequently adjusted for.

As can be understood from the above, this sampled way of logging creates a very flexible way of generating graphs over different time intervals and for creating databases for supervised learning. It thus has several benefits.

1. Provide feedback about the wildlife control effectiveness.
2. Provide feedback towards the customer about the wildlife problem.
3. Provide feedback about the detection algorithm performance.

Feedback can be used to improve the wildlife control (1) as has been thoroughly discussed. This can include teaching new patterns and setting new time slots manually or adjusting triggers and related strategies for automated wildlife control. With this data from the device it is also possible to create a very specific repelling strategy, which may also include other dispersal methods, like a net, bird spikes, chemical deterrents or sound canons. The detection system can be of great benefit for making a good bird dispersal plan for the customer.

Regarding feedback towards the customer (2), basically every customer is interested in the effectiveness of the device. Currently, there are no methods to determine repelling effectiveness apart from measuring the change in bird damage, which is an indirect way of measuring repelling effectiveness as damage reduction could also be the result of other causes (e.g. reduced crop losses could also be the result of improved harvesting techniques, better climatic conditions for crop growing than previous season or less birds were present in the area to begin with) and is always after the fact when it's too late for adjustments. With a detection system on the laser or light based repelling device, it is possible to count the birds before, during and after laser projection. With this data, the customer knows exactly how effective the device is. At the same time this can be uploaded to a manufacturer database system in order to improve future installations, as well as gain knowledge about the system as a whole which can facilitate improvement in future products. It is also possible to filter the birds on species, so it can be verified if the device is effective on a specific type of bird.

The device can also generate a hot spot image to show the effectiveness for a certain area.

The feedback about the algorithm performance (3) is purely used for internal evaluation. By sampling both times when wildlife is detected and when no wildlife is detected, an objective overview of the predicted positives and predicted negatives is obtained. By giving a subset of this data ground truth labels, a confusion matrix for evaluating the machine learning algorithms for performance improvement can be created.

System Configurations

The detection system can consist of several different configurations to make sure that it is suitable for different situations. These configurations can be hardware wise, as will be discussed below, or can be implemented in its software configuration. As laid out above, wildlife can be detected with this system but this does not mean it is limited to only wildlife. Humans, for example, can also be detected if the models are trained to do so. Actually, any kind of object can be detected when properly trained and set up for that purpose. This means that for example a human walking in the field or driving a tractor, truck or car, even a bicycle can be detected. While this could be used for its own sake, this also opens up an interesting opportunity in combination with a repelling strategy. For example, the laser can be temporarily disabled while there is an object in the view (human, car, other object) but keep moving as normal. Or, when an object on the 'forbidden list' is detected, the laser can be disabled if it is in close proximity (~1 meter) from the object. This is a kind of 'obstacle avoidance'. Another class of object here can be reflecting surfaces. For example, an installation on a roof or an area with water. This would enable a repelling strategy without taking into account those objects, making and installation easier, and using the detection system to adapt to the situation at hand. This is especially useful in an environment where the surroundings have changed, for example there was a lot of rain and a puddle of water or even a flooded area arose.

Integrated Detection System

Referring now to FIG. 9, an exemplary configuration is where the camera sensor 140 and the lens are integrated into a compact module 116 that can be inserted into a payload housing together with all other modules of a wildlife control system, such as an AVIX™ Autonomic bird control system (AVIX Autonomic is a trademark of Bird Control Group). In this case, the detection system purely acts as an advanced sensor. It consists of the sensor module 116 and the processing module 102. The processing module 102 only implements the wildlife detection software. It then provides high-level triggers via a dedicated protocol (see arrow 180) to an external system or agent (main system) 146 over UART, or only a subset of the triggers via GPIOs. The main system 146 implements the wildlife control software and both the monitoring and repelling strategy. Also, it may or may not contain an optional control module 118.

Separate Detection System

The detection module 102 can also be included into a separate housing on its own (rotating or fixed) base. This provides the system 100 with access to a different, more convenient view point compared to the rest of the installation. In this case, the detection system 102 implements the detection software and logging, as well as the monitoring strategy when on a rotating base (See unbounded systems in FIG. 10).

Independent System (No Control Processing System)

Referring back to FIG. 2. when using a separate housing it is a possibility to leave out any external agent 146 that performs the wildlife control and repelling strategy. This would mean that the system 100 only detects wildlife, but does not deter them. This can be used to perform wildlife observations or wildlife counting. Note that the control module 118 is always optional. When using a fixed base, the control module 118 disappears and the monitoring strategy is turned off via the software configuration.

Two Separate Systems

Referring back to FIG. 10, alternatively the system 100 can be placed in a box nearby, and the UART connection can still be used for communication high-level triggers towards the external system 146. This allows the detection system 102 to be used to trigger speakers 184 to disperse animals by sound. Or the system 100 can send a trigger which deactivates windmills 186 when birds come near. Again, the control module 118 is optional and the monitoring strategy can be turned off, as the external agent 146 may or may not contain a control module 188 of its own.

Multiple Detection Systems

The separate housing configuration also provides the possibility to connect several imaging modules 116 to one system 100. The system 100 can then determine what is the most important image and based on this adjust its machine behavior accordingly. Or, they can be independent systems with the sole purpose of creating an assessment of the wildlife status in the current environment creating the possibility of a continuous full coverage with fixed based systems.

System Implementation

Because of the flexibility of the system 100, a process is required for implementing it at a customer location. The most important aspect of the detection system is to be able to handle both known and unknown environments, by selecting one of two detection pipelines. In case of an unknown environment, the system can be put into operation under certain conditions, after which it can be upgraded once enough logs have been gathered. The steps for selecting components and installing a single detection system are discussed below.

1. Is automated wildlife control needed?

Yes: assemble an integrated detection system, or connect a separate detection system to the main system, go to 2.

No: assemble a separate detection system, got to 2.

2. Do the complete surroundings need to be monitored?

Yes: assemble on a rotating base, go to 3.

No: assemble on a fixed base, go to 3.

3. Does a dataset of annotated images exist of a similar environment?

Yes: configure the second detection pipeline, go to 7.

No: configure the first detection pipeline, go to 4.

4. Is the environment largely static?

Yes: go to step 5.

No: install the system at the customer location. Optimize system parameters for logging more objects more frequently, with the risk of detecting more noise, go to 6.

5. Is automated wildlife control already needed?

Yes: install the system at the customer location. Optimize system parameters for logging more frequently, go to 6.

No: install the system at the customer location. Optimize system parameters for logging more objects more frequently, with the risk of detecting more noise, go to 6.

6. Install the detection system for a determined amount of time to gather a database. Retrieve the logs via the storage extension or via the connectivity extension. Annotate the data and perform transfer learning according to the training method described. Push the updated model and reconfigure the system with the second detection pipeline, either physically via a second installation or via the connectivity extension. Go to step 7.

7. Install the detection system for operation.

8. Update periodically based on the system logs.

Step 6 is an essential step. This procedure allows the system to be upgraded from the first stage to the second stage detection pipeline. During the training period, the installer/end user can in parallel analyze the first batch of gathered log data. When pushing the new configuration, the repelling strategies can be additionally updated manually if so desired. See adapting manual strategies for details.

Having thus described certain particular embodiments of the invention, it is understood that the invention defined by the appended claims is not to be limited by particular details set forth in the above description, as many apparent variations thereof are contemplated. Rather, the invention is limited only be the appended claims which include within their scope all equivalent devices or methods which operate according to the principles of the invention as described.

What is claimed is:

1. A bird deterrence system comprising:
a camera, said camera acquiring a sequence of images of a region of interest over a learning period of time and a deterrence period of time;
a first central processor, said first central processor processing said sequence of images during said learning period of time to detect changes in pixel values within said images and create a background mask from said pixel values that have a low probability of changing over time, said first central processor processing said sequence of images during said deterrence period of time to compare changes in pixel values within said images to said background mask to detect birds within said region of interest;
a second central processor running a software application which is programmed to:
receive locations of said detected birds from said first central processing device; and
direct a repelling action to target said detected birds within said region of interest;
a repelling device; and
a control unit causing said repelling device to generate said repelling action in response to said second central processor.

2. The bird deterrence system of claim 1, wherein said repelling device is a light beam.

3. The bird deterrence system of claim 2, wherein said light beam is a laser.

4. The bird deterrence system of claim 1, wherein said repelling device is an audio device.

5. The bird deterrence system of claim 1 wherein said camera is selected from the group consisting of: CCD, CMOS, Infra-Red and thermal.

6. The bird deterrence system of claim 1 further comprising a data storage device in communication with said first central processor for storing said sequence of images of said region of interest.

7. A bird deterrence system comprising:
a camera, said camera acquiring a sequence of images of a region of interest over a learning period of time and a deterrence period of time;
a processing system programmed to:
process said sequence of images during said learning period of time to detect changes in pixel values within said images and create a background mask from said pixel values that have a low probability of changing over time;

process said sequence of images during said deterrence period of time to compare changes in pixel values within said images to said background mask to detect birds within said region of interest;

determine locations of said detected birds; and generate a repelling pattern to target said detected birds within said region of interest;

a light beam repellent device; and a control unit configured to control movement of the light beam repellent device along a trajectory consistent with said repelling pattern and activate the light beam repellent device to produce a moving light beam along the trajectory.

8. A method of detecting objects in an image comprising the steps of:

acquiring, by a camera, a sequence of images of a region of interest over a learning period of time and a deterrence period of time;

processing said sequence of images during said learning period of time to detect changes in pixel values within said images and create a background mask from said pixel values that have a low probability of changing over time; and processing said sequence of images during said deterrence period of time to compare changes in pixel values within said images to said background mask to detect objects within said region of interest.

9. The method of claim 8 further comprising the step of classifying said detected objects.

10. The method of claim 8 further comprising the step of localizing said detected object.

11. The method of claim 9 wherein said step of classifying said detected objects comprises:

generating a local search around said detected object; and performing a binary classification using a sliding window detection scheme.

12. The method of claim 8 further comprising the steps of:

identifying regions of interest in said images;

creating a repelling pattern effective for targeting said detected objects within said region of interest; and providing said repelling pattern to a deterrent device for executing said repelling pattern.

* * * * *